Patented June 16, 1953

2,642,417

UNITED STATES PATENT OFFICE 2,642,417

PROCESS FOR MAKING ANION-EXCHANGE RESINS

Robert M. Wheaton and Donald F. Harrington, Midland, Mich., assignors to The Dow Chemical Company, Midland, Mich., a corporation of Delaware No Drawing. Application May 21, 1952, Serial No. 289,195

6 Claims. (Cl. 260—88.1)

This invention concerns an improved process for reacting an alkylene polyamine with a halomethylated insoluble cross-linked copolymer of a monovinyl aromatic hydrocarbon and a polyvinyl aromatic hydrocarbon to form a resinous composition suitable for the removal of anions from fluids. The invention pertains to the production of synthetic anion exchange resins.

Anion exchange resins and a method of making the same are described in United States Patent No. 2,591,574. In brief, a resinous composition suitable for the removal of anions from fluids is prepared by reacting a primary or secondary amine such as ethylamine, dimethylamine, diethylenetriamine, or tetraethylenepentamine, with particles of a halomethylated insoluble cross-linked copolymer of a mixture consisting predominantly of a monovinyl aromatic hydrocarbon and a minor proportion of a polyvinyl aromatic hydrocarbon, e. g. a chloromethylated copolymer of styrene and divinylbenzene, or a chloromethylated copolymer of styrene, ethylvinylbenzene and divinylbenzene, whereby a polymeric amine salt is obtained. The polymeric amine salt is converted into the free amine by washing with a solution of an alkali, e. g. an aqueous 5 weight per cent solution of sodium hydroxide, which polymeric amine is then able to adsorb anions from fluids.

The amination of the halomethylated copolymer is usually carried out by adding the primary or secondary amine to the halomethylated copolymer while the latter, in granular form, is suspended and agitated in a liquid which is a solvent for the amine. The mixture is allowed to react at room temperature, or at elevated temperatures, after which the resin containing amino groups is freed from the liquid.

Carrying out the reaction of a primary or secondary amine, with a halomethylated copolymer of a monovinyl aromatic hydrocarbon and a polyvinyl aromatic hydrocarbon in an organic liquid which is a solvent for the amine has the disadvantage that it involves handling large quantities of said solvent, and adds to the cost of the product. Although water is a relatively inexpensive medium which may frequently be employed when using a water-soluble amine as the reactant, certain of the amines, more specifically, alkylene polyamines such as ethylenediamine, propylenediamine, diethylenetriamine, or tetraethylenepentamine, cannot readily be reacted with the halomethylated copolymers to form a corresponding polymeric amine product having a high anion exchange capacity when employing water as a suspending medium for the granular halomethylated copolymer or as a solvent for the amine. The reaction may be carried out employing a large excess of the alkylene amine, in which case no other suspending medium need be used. However, such procedure is costly since the excess alkylene polyamine is difficult to recover from the reaction mixture.

It has now been found that an alkylene polyamine can readily be reacted with a granular halomethylated insoluble cross-linked copolymer of a mixture consisting predominantly of a monovinyl aromatic hydrocarbon and a minor proportion of a polyvinyl aromatic hydrocarbon, by suspending the granular halomethylated copolymer in an aqueous solution containing from 30 to 60 per cent by weight of an alkali metal hydroxide, adding the alkylene polyamine, e. g. diethylenetriamine, thereto, agitating the mixture, and allowing the reaction to occur at room temperature or at elevated temperatures, after which the resin, containing amino groups, is separated from the liquid.

By carrying out the reaction in admixture with an aqueous solution of an alkali metal hydroxide, preferably sodium hydroxide, in concentration of from 30 to 60 per cent by weight of the solution, the reaction is caused to occur rapidly and completely to replace the halogen atoms of the halomethyl groups on aromatic nuclei in the copolymer, whereby a polymeric amine is formed. A final washing with water permits the aminated resin to be recovered in its basic or free amine form.

The insoluble cross-linked copolymers of aromatic mono- and polyvinyl hydrocarbons to be employed in preparing the halomethylated polymeric starting materials are obtained by copolymerizing an aromatic hydrocarbon containing one vinyl substituent with an aromatic hydrocarbon containing two or more vinyl substituents. The aromatic hydrocarbons are preferably members of the benzene and naphthalene series, i. e. they contain not more than 10 carbon atoms in the aromatic nucleus. Examples of suitable monovinyl aromatic hydrocarbons are styrene, ortho-, meta-, and para-methylstyrenes, ortho-, meta-, and para-ethylstyrenes, vinylnaphthalenes, ar-dimethylstyrenes, or para-isopropylstyrene. Suitable polyvinyl aromatic hydrocarbons are divinylbenzene, trivinylbenzene, divinylethylbenzenes, divinylnaphthalenes, divinyltoluenes and divinylxylenes. Mixtures of any two or more of such monovinyl aromatic hydrocarbons and polyvinyl aromatic hydrocarbons may also be used in preparing the insoluble cross-linked copolymers. The copolymers should contain a predominant amount, preferably 80 per cent by weight or more, of at least one of the aforementioned monovinyl aromatic hydrocarbons chemically combined, i. e. interpolymerized, with a polyvinyl aromatic hydrocarbon, e. g. divinylbenzene, in amount of from 0.1 to 20 per cent by weight of the copolymer.

The copolymers may be prepared by known methods for polymerizing styrene. The monomers may be mixed and polymerized in mass, or they may be suspended in a liquid non-solvent for the monomers such as water, or an aqueous brine solution, and then heated, agitated and polymerized. The latter method is preferred because this method yields hard copolymers in the form of small spheroids, beads, or rounded particles, and the size of such particles can be regulated and controlled.

The polymerization of the vinyl aromatic hydrocarbons may advantageously be carried out employing catalysts which provide oxygen such as benzoyl peroxide, lauroyl peroxide, tertiary-butylhydroperoxide, di-tertiarybutylperoxide, or tertiary-butylperbenzoate, etc.

Halomethylation of the insoluble copolymers may be carried out by reacting a halomethylating agent such as chloromethyl methyl ether, bromomethyl methyl ether, or a mixture of formaldehyde and hydrochloric acid, with the copolymer in granular form while the latter is swollen by an organic liquid, such as benzene, perchloroethylene, or chlorobenzene, which is less reactive with the halomethylating agent than is the copolymer. Chloromethyl methyl ether swells the copolymer and may be used both as the swelling and halomethylating agent. The halomethylating reaction is carried out in the presence of a catalyst such as zinc chloride, stannic chloride, ferric chloride, aluminum chloride, or zinc oxide. Methods of halomethylating which may be used for introducing chloromethyl groups in the copolymers are described in "Organic Reactions" vol. 1, chapter 3, page 63 et seq. (John Wiley & Sons, Inc., New York city 1942).

The halomethylated copolymers should contain an average of from 0.1 to 1.2, preferably from 0.4 to 1.2 halomethyl groups per aromatic nucleus in the copolymer. The extent of the halomethylation reaction may conveniently be determined by a halogen analysis.

Amination of the halomethylated copolymer is carried out by adding an alkylene polyamine to the granular halomethylated copolymer while the latter is suspended in an aqueous solution of an alkali metal hydroxide of from 30 to 60 weight per cent concentration, based on the weight of the solution. The mixture is agitated and allowed to react at room temperature, or at elevated temperatures of from 50° to 130° C., preferably from 80° to 120° C. after which the resin, containing amino groups, is freed from the liquid, suitably by filtering and washing with water.

An aqueous solution of any alkali metal hydroxide, e. g. sodium hydroxide or potassium hydroxide, in concentration of from 30 to 60, preferably from 30 to 50, per cent by weight may be employed as the suspending medium. The alkylene polyamines are insoluble or substantially insoluble in aqueous solutions containing from 30 to 60 per cent by weight of such alkali metal hydroxides. For convenience and economy of operation, sodium hydroxide is preferred. The aqueous solution is usually employed in amount of from 1 to 2 parts by weight per cent of the halomethylated copolymer used, but greater amounts may be used, it being sufficient to employ the suspending medium in amount such as to provide a slurry of the granular copolymer and the liquid which can conveniently be stirred.

The alkylene polyamine is used in amount corresponding to from 0.9 to 2, preferably from 1 to 1.5 moles of the alkylene polyamine per halomethyl group in the copolymer. Larger proportions of the alkylene polyamine may be used, but are wasteful since the unreacted alkylene polyamine is difficult to recover from the reaction mixture.

It is advantageous to swell the halomethylated copolymer prior to reacting the alkylene polyamine therewith. The swelling facilitates the subsequent amination and may be carried out by soaking the halomethylated copolymer in an organic liquid such as benzene, toluene, perchloroethylene, tetrachloroethane, or trichloroethane. The copolymer swells, or is swollen during the halomethylating reaction, e. g. by contact with chloromethyl methyl ether. In a preferred practice, the granular halomethylated copolymer in swollen and wet condition, i. e. after washing with water to remove the halomethylating agent and catalyst, is suspended in an aqueous solution containing from 30 to 50 per cent by weight of sodium hydroxide and an alkylene polyamine, e. g. diethylenetriamine, is added thereto in the desired proportion. The mixture is stirred and maintained at a reaction temperature, preferably between 80 and 120° C., until the reaction is complete. Thereafter, the resin containing amino groups is separated from the liquid and is washed with water.

The following examples illustrate ways in which the principle of the invention has been applied, but are not to be construed as limiting the invention.

*Example 1*

A purpose of this example is to illustrate the preparation of a halomethylated copolymer.

A charge of 100 parts by weight of a benzene-insoluble copolymer containing in chemically combined form 93.5 per cent by weight of styrene, 2.5 per cent of ethylvinylbenzene and 4 per cent of divinylbenzene, which copolymer was in the form of rounded beads of a size such as to pass through a 20 mesh per inch standard Tyler screen and be retained on an 80 mesh screen, was placed in a reaction vessel equipped with a reflux condenser and stirrer. One hundred parts by weight of perchloroethylene and 300 parts of chloromethyl methyl ether was added thereto. The mixture was stirred and was heated at a temperature of 50° C. over a period of one hour to swell the copolymer beads, then cooled. Thereafter, 50 parts by weight of zinc chloride was added thereto, with stirring. The mixture was stirred and maintained at a reaction temperature between 50° and 60° C., over a period of 4 hours. The copolymer was separated by filtering and was washed with water. The volume of the wet chloromethylated copolymer beads was approximately twice the volume of the dry copolymer starting material. A weighed portion of the wet chloromethylated copolymer was steamed to remove the occluded perchloroethylene, then dried and re-weighed. The dried chloromethylated copolymer was analyzed and found to contain 19.24 per cent by weight of chlorine. The wet chloromethylated copolymer contained 47.14 per cent by weight of volatile substances principally perchloroethylene which compound swells the copolymer. The chloromethylated copolymer contained 10.17 per cent by weight of chlorine on a wet basis.

*Example 2*

A charge of 500 grams of the batch of the wet chloromethylated copolymer described in Example 1, containing 10.17 per cent by weight of chlorine, was suspended in 600 grams of an aqueous 50 weight per cent solution of sodium hydroxide. 148 grams (1.43 moles) of diethylenetriamine was added thereto. The mixture was stirred and heated at a reaction temperature between 100° and 110° C. over a period of 2 hours, then cooled. The resin was separated by filtering and was washed with water. The aminated copolymer was steamed for a period of 3 hours to remove the perchloroethylene occluded in the swollen chloromethylated copolymer starting material. The resin was washed with water. The aminated resin was in its basic form. A 10 cc. portion of the granular aminated resin was suspended in 50 cc. of a one normal hydrochloric acid solution. The mixture was allowed to stand at room temperature over a period of 16 hours. The resin was separated by filtering and was washed with water. The washings and filtrate were combined and analyzed for hydrochloric acid. An anion exchange capacity value for the aminated copolymer was calculated from the amount of hydrochloric acid adsorbed by the resin. The aminated copolymer had an anion exchange capacity corresponding to 60,400 grains of calcium carbonate per cubic foot of a bed of the resin.

*Example 3*

A charge of 100 grams of a batch of a wet (water-washed) chloromethylated copolymer containing in chemically combined form 93.5 per cent by weight of styrene, 2.5 per cent of ethylvinylbenzene and 4 per cent of divinylbenzene, was placed in a reaction vessel equipped with a reflux condenser and stirrer. The chloromethylated copolymer was prepared by procedure similar to that described in Example 1. A portion of the wet, i. e. the water-washed, chloromethylated copolymer was extracted with acetone and was dried and analyzed for chlorine. It was found to contain 16.55 per cent by weight of chlorine (dry basis). The wet chloromethylated copolymer contained 38 per cent of acetone soluble substances, principally perchloroethylene which swells the copolymer. The wet chloromethylated copolymer contained 10.26 per cent by weight of chlorine. The granular chloromethylated copolymer was suspended in 143 grams of an aqueous 50 weight per cent solution of sodium hydroxide. 41 grams of anhydrous diethylenetriamine was added thereto. The mixture was stirred and heated at temperatures between 90° and 100° C. over a period of 2 hours, then cooled. The resin was separated by filtering and was washed with water. The aminated resin was steamed for a period of 3 hours to remove the occluded perchloroethylene and was washed with water. An anion exchange capacity value for the resin was determined as described in Example 2. The aminated resin had an anion exchange capacity corresponding to 56,100 grains of calcium carbonate per cubic foot of a bed of the granular resin.

A similar charge of 100 grams of the batch of the wet chloromethylated copolymer was suspended in a solution of 143 grams of water and 41 grams of diethylenetriamine. The mixture was stirred and heated under reflux over a period of 2 hours. The aminated resin was separated by filtering and was treated with an aqueous 4 weight per cent solution of sodium hydroxide to convert the resin to its basic form and was washed with water. The aminated resin had an anion exchange capacity corresponding to only 16,100 grains of calcium carbonate per cubic foot of a bed of the granular resin.

*Example 4*

A charge of 100 grams of the batch of the wet chloromethylated copolymer described in Example 3, was suspended in 143 grams of an aqueous 30 weight per cent solution of sodium hydroxide. 41 grams of diethylenetriamine was added thereto. The mixture was stirred and heated at a temperature between 90° and 100° C. over a period of 2 hours. The resin was separated and was washed with water. Its anion exchange capacity was determined by procedure described in Example 2. The aminated resin had an anion exchange capacity corresponding to 49,100 grains of calcium carbonate per cubic foot of a bed of the granular resin.

The experiment was carried out in similar manner by suspending another charge of 100 grams of the wet chloromethylated copolymer in 143 grams of an aqueous 10 weight per cent solution of sodium hydroxide and adding 41 grams of diethylenetriamine thereto. The aminated resin had an anion exchange capacity corresponding to only 29,900 grains of calcium carbonate per cubic foot of a bed of the granular resin.

*Example 5*

A charge of 50 grams of the batch of the wet chloromethylated copolymer beads described in Example 3, and 25 grams of propylenediamine, together with 88 grams of an aqueous 50 weight per cent solution of sodium hydroxide, was placed in a glass reaction flask equipped with a reflux condenser and stirrer. The mixture was stirred and heated at its reflux temperature over a period of 2 hours, then cooled. The copolymer was separated by filtering, was washed with water and was steamed to remove the occluded perchloroethylene. The polymeric amine was in its basic form. A portion of the aminated copolymer was tested for anion exchange capacity by the procedure described in Example 2. The product was found to possess an anion exchange capacity corresponding to 51,500 grains of calcium carbonate per cubic foot of a bed of the aminated copolymer beads.

Another charge of 100 grams of the wet chloromethylated copolymer was reacted with propylenediamine under the same time and temperature conditions, except using 75 grams of water as the suspending medium. The aminated copolymer had an anion exchange capacity corresponding to only 11,650 grains of calcium carbonate per cubic foot of a bed of the aminated resin beads.

*Example 6*

A charge of 50 grams of the batch of the wet chloromethylated copolymer beads described in Example 3, and 25 grams of tetraethylenepentamine, together with 50 cc. of an aqueous 50 weight per cent solution of sodium hydroxide as suspending medium, was placed in a glass reaction flask equipped with a reflux condenser and stirrer. The mixture was stirred and heated at its reflux temperature over a period of 2 hours, then cooled. The aminated copolymer was separated, was washed with water and was steamed to remove perchloroethylene occluded in the chloromethylated copolymer starting material. The aminated copolymer was in its basic form. An anion exchange capacity value for the aminated resin was determined by the procedure described in Example 2. The product was found to have an anion exchange capacity corresponding to 48,700 grains of calcium carbonate per cubic foot of a bed of the aminated resin beads.

The experiment was carried out in similar manner by suspending another charge of 100 grams of the wet chloromethylated copolymer in 50 cc. of water and adding 25 grams of tetraethylenepentamine thereto. The aminated product was found to have an anion exchange capacity corresponding to only 23,300 grains of calcium carbonate per cubic foot of a bed of the resin beads.

*Example 7*

A charge of 284 pounds of the batch of the wet chloromethylated copolymer described in Example 1, containing 10.17 per cent by weight of chlorine, was placed in a reaction vessel equipped with a reflux condenser and stirrer. The granular chloromethylated copolymer was suspended in 350 pounds of an aqueous 50 weight per cent solution of sodium hydroxide. 100 pounds (0.97 mole) of diethylenetriamine was added thereto. The mixture was stirred and maintained at a reaction temperature between 90° and 95° C. over a period of 3 hours. The resin was separated by filtering and was washed with water. The aminated resin was in its basic amine form. The anion exchange capacity of the resin was determined by procedure described in Example 2. The product had an anion exchange capacity corresponding to 59,400 grains of calcium carbonate per cubic foot of a bed of the granular aminated resin.

*Example 8*

A charge of 500 grams of the batch of the wet chloromethylated copolymer described in Example 1, containing 10.17 per cent by weight of chlorine, was suspended in 785 grams of an aqueous 60 weight per cent solution of sodium hydroxide. 176 grams (1.71 moles) of diethylenetriamine was added thereto. The mixture was stirred and heated at a temperature between 105° and 110° C. over a reaction period of 2 hours. The resin was separated by filtering and was washed with water. The aminated resin was steamed for a period of 2.5 hours to remove the perchloroethylene occluded in the swollen chloromethylated copolymer starting material. After steaming, the resin was washed with water. The aminated resin was in its basic or free amine form. An anion exchange capacity value was determined for the aminated resin by procedure described in Example 2. The aminated resin had an anion exchange capacity corresponding to 55,500 grains of calcium carbonate per cubic foot of a bed of the granular resin.

*Example 9*

A charge of 500 grams of the batch of the wet chloromethylated copolymer described in Example 1, containing 10.17 per cent by weight of chlorine, was suspended in 700 grams of an aqueous 50 weight per cent solution of potassium hydroxide. 200 grams (1.94 moles) of diethylenetriamine was added thereto. The mixture was stirred and heated at a temperature of 102° C. over a reaction period of 2 hours. The resin was separated by filtering and was washed with water. The aminated resin was steamed for a period of 2.5 hours to remove the perchloroethylene occluded in the swollen chloromethylated copolymer starting material. After steaming, the aminated resin was washed with water. The aminated resin was in its basic form. An anion exchange capacity value for the aminated resin was determined by the procedure described in Example 2. The aminated resin had an anion exchange capacity corresponding to 54,600 grains of calcium carbonate per cubic foot of a bed of the resin.

We claim:

1. In a process for making an anion exchange resin wherein a halomethylated copolymer of a major proportion by weight of a monovinyl aromatic hydrocarbon and a minor proportion of a polyvinyl aromatic hydrocarbon, which halomethylated copolymer contains halomethyl groups selected from the class consisting of the chloromethyl and bromomethyl groups as nuclear substituents, is reacted with an amine containing a hydrogen atom on the nitrogen atom, the steps which consist in heating particles of the halomethylated copolymer and an alkylene polyamine in proportions corresponding to from 0.9 to 2 moles of the alkylene polyamine per halomethyl group in the copolymer in admixture with an aqueous solution containing from 30 to 60 per cent by weight of an alkali metal hydroxide, in amount sufficient to form a slurry capable of being stirred, at a reaction temperature between 25° and 130° C. whereby a polymeric alkylene polyamine is formed and separating the polymeric amine from the reaction mixture.

2. A process, as claimed in claim 1, wherein the halomethylated copolymer contains an average of from 0.1 to 1.2 chloromethyl groups per aromatic nucleus in the copolymer.

3. A process, as claimed in claim 1, wherein the copolymer contains in chemically combined form from 80 to 99.5 parts by weight of a monovinyl aromatic hydrocarbon and from 0.1 to 20 parts by weight of a divinyl aromatic hydrocarbon per 100 parts by weight of the copolymer, the said copolymer having an average of from 0.1 to 1.2 chloromethyl groups per aromatic nucleus in the copolymer.

4. A process, as claimed in claim 1, wherein the alkylene polyamine is diethylenetriamine.

5. A process, as claimed in claim 1, wherein the alkylene polyamine is propylenediamine.

6. A process, as claimed in claim 1, wherein the alkylene polyamine is tetraethylenepentamine.

ROBERT M. WHEATON.
DONALD F. HARRINGTON.

No reference cited.